United States Patent Office 3,354,713
Patented Nov. 28, 1967

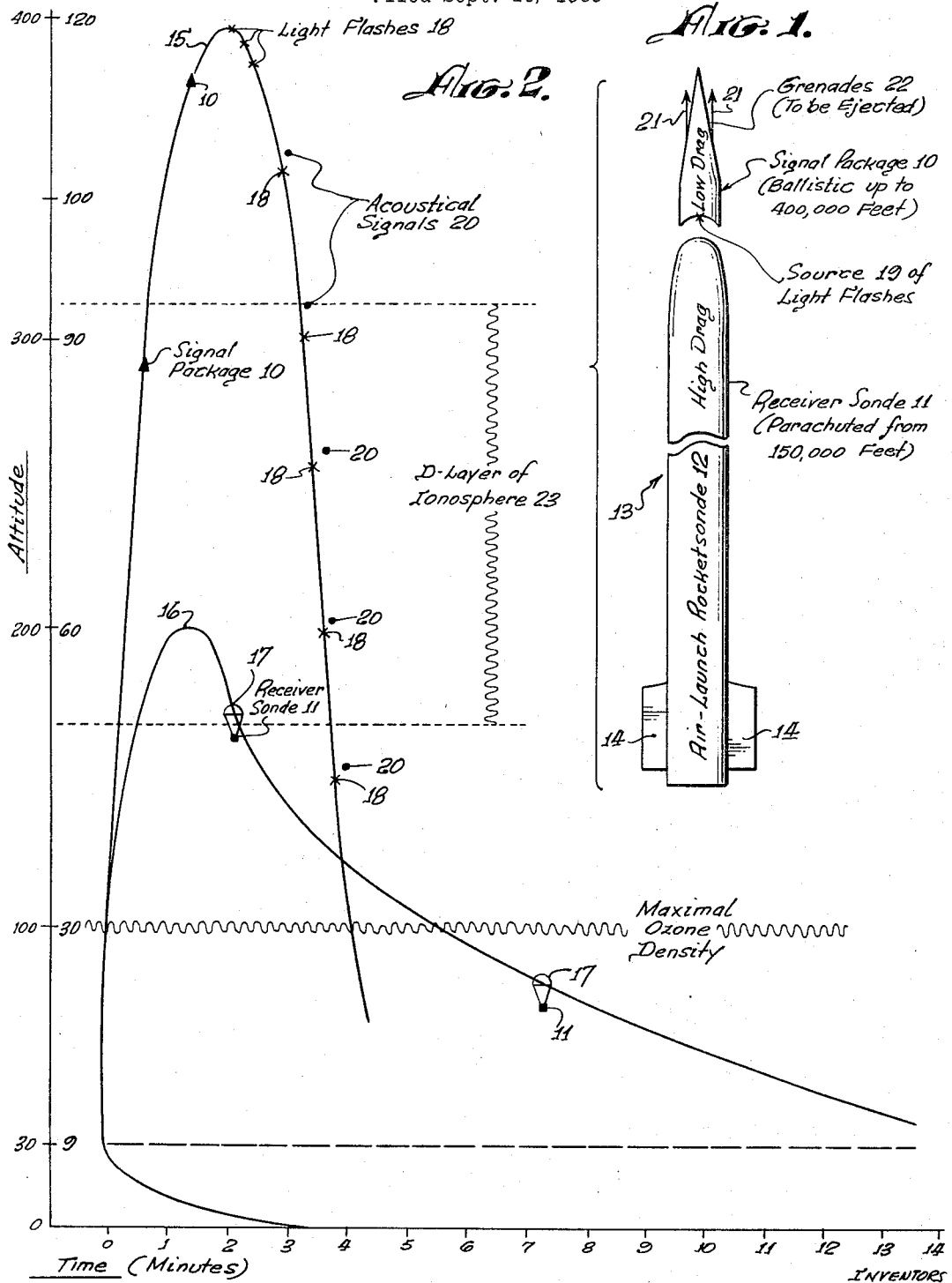

3,354,713
ACOUSTO-OPTICAL PROBING SYSTEM
Richard J. Sneed, Upland, and Klaus J. Kronenberg, Claremont, Calif., assignors to General Dynamics Corporation, Pomona, Calif., a corporation of Delaware
Filed Sept. 10, 1965, Ser. No. 486,323
16 Claims. (Cl. 73—170)

ABSTRACT OF THE DISCLOSURE

Broadly, the disclosure is an acousto-optical probing system producing a method of upper atmosphere testing wherein a signal source vehicle and a detector and transmitter vehicle are co-launched on a single rocket, or separately, into different trajectories of widely varying altitude. The detector-transmitter vehicle which is limited to the lower altitude is provided with a drag chute to separate it from the launch vehicle and to lower it at a slow rate relative to that of the signal source vehicle so as to receive signals produced by the latter and to transmit them to an airborne or ground metering station. The method thereby provides a detection system in the highly undisturbed environment of the test area rather than at the error-prone ground level.

---

This invention relates in general to rocket projectiles, particularly to rocket vehicles designed for conducting high altitude testing, and more particularly to a rocket launched system for providing information, on a routine basis, about all altitude levels of the earth-ionosphere.

It has been recognized that it would be desirable to develop a high-altitude testing vehicle which would be relatively inexpensive and capable of carrying sufficient instrumentation payloads to obtain measurements and conduct experiments in high altitude regions. Such a device would be an extremely useful tool for ionospheric meteorologists and high altitude scientists in making meteorological measurements and high altitude experiments of various types. However, because of the delicate instrumentation to be employed in the payload of such a vehicle, special design requirements are imposed, in order to achieve desired properties of low initial velocity so as to minimize deleterious aerodynamic heating effects; and low peak accelerations must be provided to protect the instrumentation. Many prior attempts have been made to solve this problem such as illustrated, for example, by U.S. Patent No. 3,101,052 and by the U.S. Air Force's "Rockaire" program. However, none of these prior attempts have provided the solution, particularly with the simplicity and relative low cost provided by this invention.

The present invention utilizes a vehicle system capable of providing information, on a routine basis, about the wind, temperature, density, components, and their variations in all altitude levels (including the D-layer) of the earth-ionosphere (altitude of 120,000–400,000 feet). This is accomplished by controlled optical and acoustical signals emitted from a signal source vehicle launched ballistically to an altitude of up to 400,000 feet, which signals are detected and transmitted by a co-launched vehicle having an apogee of about 150,000 feet.

All known up-to-date activity in D-layer altitude is based on much larger vehicles and more elaborate evaluation (smoketrail, aerobee-rocket) forestalling regular routine application. The rather inexpensive vehicles and highly automatic evaluation of the present concept offers for the first time a real survey of D-layer conditions and their variations with times of day and year, and geography. Thus, this system can provide for the first time the desperately needed link of knowledge between interplanetary space (regularly surveyed by satellites) and low altitude weather (regularly surveyed by balloons).

Former concepts aimed at and used for measurements of conditions in the D-layer altitude of the atmosphere are based on signal reception at ground level. The concept disclosed herein has the receivers put into a highly undisturbed environment. This eliminates background-noise, scatter of lower, dense air-layers, effects of tropospheric weather conditions, and visibility interruption by clouds. Thus, the new concept of combination of light and sound signals simultaneously offers valuable computation capacity.

Therefore, it is an object of this invention to provide a vehicle system by which conditions in space can be studied and the results observed.

A further object of the invention is to provide a high altitude condition test vehicle arrangement.

Another object of the invention is to provide a system whereby information can be obtained on all altitude levels of the earth-ionosphere.

Another object of the invention is to provide a ballistically launched multiple vehicle system, one having a higher apogee than the other and emitting optical and acoustical signals which are received and transmitted by the other.

Another object of the invention is to provide a vehicle system for obtaining information, on a routine basis, about wind, temperature, density, components and their variations in all altitude levels between 120,000 and 400,000 feet.

Other objects of the invention, not specifically set forth above, will become readily apparent from the following description and accompanying drawings wherein:

FIG. 1 is a partial schematic illustration, partially exploded, illustrating the vehicle system prior to launch; and FIG. 2 is an altitude-time diagram illustrating a flight pattern of the invention.

Referring now to the drawings, controlled optical and acoustical signals are emitted from a signal source vehicle (SSV) 10 launched ballistically to an altitude of up to 400,000 feet. Co-launched with the (SSV) 10 is a second vehicle or the detector and transmitter sonde (DTS) 11. This second vehicle 11 has an apogee of approximately 150,000 feet and, from this altitude, descends by parachute at a rate which is slow compared to that of the source vehicle (SSV) 10. The (DTS) 11 package contains all instrumentation to receive and identify the signals from the (SSV) 10. Also included in the (DTS) 11 is the signal transmitter. The telemetered signals are received, decoded, and corrected in an airborne or ground based evaluation center (not shown).

Both vehicles (SSV) 10 and (DTS) 11 are launched simultaneously by one propulsion system from either a ground launch site or by means of an air-launched rocket-sonde system 12. The air-launched mode is preferred since it provides unlimited selection of launch site locations. If required, the vehicles 10 and 11 can be launched simultaneously from separate launch sites. As shown in FIG. 2, the air-launched rocket-sonde system 12, containing the vehicles (SSV) 10 and (DTS) 11 is launched at 30,000 feet at time "0" from an aircraft or the like. The flight time sequence is based from time "0" which starts at 30,000 feet altitude as indicated by the lines above this altitude in the drawing, with the line between 30,000 feet and ground or "0" altitude is representative of the time required for the carrier vehicle to reach the 30,000 foot launch altitude. However, this last-mentioned time period could be of a greater or lesser amount.

For co-launch the (SSV) 10 is mounted as a low-drag nose cone (see FIG. 1). This nose cone is mounted on top of a high-drag configuration launch vehicle generally indicated at 13 which contains the (DTS) 11, a medium altitude sonde (not shown) which is parachuted from 150,000 to 30,000 feet or less, the propulsion unit 12, and all necessary aerodynamic control mechanisms indicated at 14. The launch motor 12 performance is such that on burnout (approximately 1.8 seconds) the system velocity insures acquisition of the desired apogees of both payload packages (SSV) 10 and (DTS) 11. After burnout the low drag (SSV) 10 is separated at a preset altitude (or time) by conventional mechanism and continues its high altitude trajectory 15, as illustrated in FIG. 2, while the high drag vehicle 13 is limited to the low altitude trajectory 16 as seen also in FIG. 2. Near the low altitude apogee, the (DTS) 11 package, by means of a drag chute 17, separates from the launch vehicle 13 and descends while receiving and transmitting signals from the (SSV) 10.

The (SSV) package 10 (keeping flight attitude stable by rotational control) emits a minimum of, for example, ten (10) precisely timed light flashes such as indicated at 18 in FIG. 2 from a source 19 mounted at the bottom of the vehicle 10. The optical signal source 19, for example, may be a lamp such as a high-pressure xenon-argon type.

Acoustical signals 20 are emitted also at precisely timed intervals. The source location indicated by arrows 21 and timing of the acoustical signals 20 is such that no interference with the optical signals 18 occurs. Due to the size of presently known acoustical sources, such as grenades 22, the number of acoustical signals 20 will be less than the number of optical signals 18, there being five (5) signals 20 shown in FIG. 2. Timing of the signals 20 will be such that the altitude range of interest, namely, the D-layer indicated at 23, is uniformly covered, independent of the apogee of the (SSV) 10. The means for ejecting grenades 22 from the (SSV) 10 does not constitute part of this invention and can be accomplished by conventional methods, thus a description thereof is deemed unnecessary.

The optical receiver (not shown) of the (DST) 11 consists of a collector-collimator-photomultipler system with suitable bandpass filtering. Filter selection is based on user preference with respect to emphasis on atmospheric constituents (e.g., ozone) and on most representative absorption bands for density determination. Quantitative data evaluation will be based on either source power emittance $\lambda$ (watts/ster/$\mu$) and relative source-receiver geometry, or by comparison with signal transmission in an atmospheric transmission window near the specific absorption bands of interest. The optical detection and/or collecting system may be mounted either in the center of the descent parachute 17 or in the body of the (DTS) sonde 11. In the latter case, the parachute or parachute cluster will have an opening permitting passage of source signals 18.

The acoustical detector (not shown) of the (DTS) 11 consists of an array of high sensitivity microphones mounted on the periphery of the parachute 17 or parachute cluster. Chute stabilization and/or directional reference signals are incorporated to obtain directional acoustical information (wind velocity).

Raw data and reference signals are transmitted by means of a telemetry system (not shown) to either the departing launch plane (air-launched mode) or the nearest ground station. Meteorological or military frequency bands may be employed.

Optical signal attenuation provides information on: (1) partial pressure and density of specific atmospheric constituents from specific absorption band measurements, and (2) total atmospheric pressure from absorption measurements in representative absorption bands.

Acoustical signals provide information on: (1) speed of sound, which in turn provides a measure of temperature (based on optically measured densities), the arrival time being related to arrival time of the optical signals, and (2) wind speed and direction from the difference in arrival time and intensity at various receiving microphones.

The present invention provides the following advantages:

(1) Optical and acoustical measurements over path lengths of several 100,000 feet are superior to localized measurements which are influenced, far more seriously, by the presence of the sonde vehicle or the sensor itself (contamination and aerodynamic disturbances near the sensor).

(2) The receiver system, in the present system, is at high altitudes thus minimizing (a) the masking effects of the high density lower atmosphere, and (b) the ground noise influence on acoustic measurements of high quality.

(3) The limiting factors imposed by use of natural sources (sun, moon, etc.) which undergo geometrical, seasonal, and daily changes are avoided by the use of controlled optical sources.

(4) The system fills the present void of reliable information between satellite altitudes and balloon and rocketsonde altitudes (150,000 feet maximum). That is measurements can be taken in the D-layer range where many of the phenomena take place which are highly influential on the weather picture.

(5) Geographic accessibility is eliminated as a barrier to obtaining world-wide synoptic information when coupled to air-launch modes.

(6) Information can be obtained, equally well, during day or night operation, polar winter conditions, severe air traffic, local weather disturbances, and during enemy activities.

(7) Mission time is short (less than 250 seconds).

(8) Data can be taken either routinely in a static, worldwide network of locations or, on short notice, in critical areas of particular interest (military, space craft launch or re-entry, or meteorological).

(9) Operation is economical and boost requirements minimized by having only the signal sources propelled to the ceiling altitude (400,000 feet).

The concept of this invention can be applied for exploration of unknown planet-atmospheres. The launching of a similar signal-package from an orbiting space craft toward the unknown atmosphere of the orbited planet, and signal tracing by receivers at the space craft can deliver essential information about conditions for entry and navigation in the unknown atmosphere.

It is thus seen that there are many applications for the present invention, of both civilian and military nature, the following being exemplary:

(1) Meteorological research of weather-forming factors.

(2) Meteorological survey for air traffic.

(3) Meteorological survey for launching and re-entry of satellites, space craft, and long range missiles.

(4) Data gathering for strategic and tactical purposes (e.g., prediction of radioactive fallout pattern and chemical warfare parameters of similar nature and, in turn, anticipation of potential enemy activities).

Although a particular embodiment of the invention has been illustrated and described, modifications will become apparent to those skilled in the art, and it is intended to cover in the appended claims all such modifications as come within the true spirit and scope of the invention.

What we claim is:

1. An acoustical-optical probing system comprising: a first vehicle for emitting optical and acoustical signals, a second vehicle for receiving and transmitting said signals emitted from said first vehicle, said first and second vehicles being operatively connected during launch and adapted to separate after launch, means for simultaneously co-launching said first and second vehicles, said first vehicle being of a low-drag configuration, said second vehicle being of a high-drag configuration, and means for causing said second vehicle to descend at a slower rate, whereby said first and second vehicles when launched simultaneously travel after a predetermined period of time in different trajectories, said first vehicle travelling in a higher trajectory than said second vehicle due to the low-drag configuration of said first vehicle.

2. A system for obtaining information on conditions of all altitude levels between 120,000 and 400,000 feet comprising: a signal source vehicle, said source vehicle containing means for emitting optical signals and means for emitting acoustical signals, a second vehicle, said second vehicle containing means for receiving and transmitting said optical and acoustical signals and operatively connected to said source vehicle prior to launch and adapted to be separated therefrom after launch, means for launching said source vehicle and said second vehicle, said source vehicle being adapted to be launched in a trajectory having an apogee up to 400,000 feet altitude, said second vehicle being adapted to be launched in a trajectory having an apogee up to 150,000 feet altitude, and means for causing said second vehicle to descend at a slower rate than the descent of said source vehicle.

3. The system defined in claim 2, wherein said launching means co-launches said source and second vehicles simultaneously in a ballistic mode.

4. The system defined in claim 3, wherein said simultaneous co-launch of said source and second vehicles is of the air-borne mode.

5. The system defined in claim 2, wherein said signal source vehicle has a low drag configuration and said second vehicle has a high drag configuration.

6. The system defined in claim 2, wherein said second vehicle is provided with means for separating same from said launching means.

7. The system defined in claim 6, wherein said separating means for said second vehicle is a drag chute.

8. The system defined in claim 2, wherein said last mentioned means includes parachute means.

9. The system defined in claim 2, wherein said means for emitting optical signals is a lamp-like means of the high-pressure xenon-argon type.

10. The system defined in claim 2, wherein said means for emitting acoustical signals comprises a plurality of grenade-like means ejected at predetermined intervals.

11. The system defined in claim 2, wherein said acoustical signals are emitted in such a manner that no interference with the optical signals is created.

12. An air-launched acousto-optical probing system for high altitudes comprising a launch vehicle having aerodynamic control mechanism thereon, a high drag configured detector and transmitter sonde operatively positioned on one end of said launch vehicle, said sonde being provided with drag chute means for separating same from said launch vehicle and also functioning to slow the descent of the sonde, a low drag configured signal source vehicle operatively mounted on the forward end of said sonde, said signal source vehicle being provided with means for generating optical signals and means for generating acoustical signals, said signal source vehicle being adapted to separate from said sonde at a predetermined altitude, said launch means being adapted to launch said sonde and said signal source vehicle ballistically in different trajectories due to the drag configuration of said sonde and said signal source vehicle, said signal source vehicle being launched in a trajectory having an apogee up to 400,000 feet, said sonde being launched in a trajectory having an apogee up to 150,000 feet, whereby the optical and acoustical signals generated by said signal source vehicle are detected and transmitted by said sonde while said sonde is at a substantially high altitude thereby minimizing the masking effects of the high density lower atmosphere and the ground noise influence on acoustic measurements.

13. The air-launched acousto-optical probing system defined in claim 12, wherein said acoustical and optical signals are generated at timed intervals, said acoustical signals being generated such that no interference with the optical signals occurs.

14. The air-launched acousto-optical probing system defined in claim 13, wherein the number of said acoustical signals is less than the number of said optical signals.

15. The air-launched acousto-optical probing system defined in claim 12, wherein said optical signal generating means comprises a lamp means of the high-pressure xenon-argon type.

16. The air-launched acousto-optical probing system defined in calim 12, wherein said acoustical signal generating means comprises a plurality of grenades adapted to be ejected from said signal source vehicle intermediate said optical signals.

References Cited

UNITED STATES PATENTS

| | | | |
|---|---|---|---|
| 2,358,796 | 9/1944 | Edgerton | 95—11.5 |
| 2,390,739 | 12/1945 | Scherbatskoy | 73—170 |
| 2,413,621 | 12/1946 | Hammond | 102—34.1 X |
| 2,763,447 | 9/1956 | Carrau | 102—49 X |
| 3,064,480 | 11/1962 | Sekella | 73—170 X |
| 3,092,770 | 6/1963 | Shoemaker | 325—4 |

OTHER REFERENCES

The Evening Star, Washington, D.C., May 7, 1952, p. A20, "Speculation on Temperatures."

"Instrumentation of the Rocket-Grenade Experiment for Measuring Atmospheric Temperatures and Winds," Stround, W. G., et al., in Review of Scientific Instruments, vol. 26, No. 5, May 1955, pp. 427–432.

RICHARD C. QUEISSER, *Primary Examiner.*

JAMES J. GILL, *Examiner.*

J. J. SMITH, J. W. MYRACLE, *Assistant Examiner.*